(12) United States Patent
Schweizer

(10) Patent No.: US 6,329,634 B1
(45) Date of Patent: Dec. 11, 2001

(54) WORKPIECE IRRADIATION SYSTEM

(75) Inventor: Jürgen Schweizer, Göttingen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/617,484

(22) Filed: Jul. 17, 2000

(51) Int. Cl.$^7$ ..................................................... B23K 26/36
(52) U.S. Cl. .............................. 219/121.73; 219/121.78
(58) Field of Search ........................ 219/121.73, 121.74, 219/121.75, 121.76, 121.77, 121.78, 121.79

(56) References Cited

U.S. PATENT DOCUMENTS

| | | | |
|---|---|---|---|
| 4,713,544 | * 12/1987 | Grage | 250/353 |
| 5,589,090 | * 12/1996 | Song | 219/121.75 |
| 5,618,454 | 4/1997 | Freedenberg et al. | |
| 5,674,414 | 10/1997 | Schweizer . | |

FOREIGN PATENT DOCUMENTS

| | | |
|---|---|---|
| 195 13 354 A1 | 4/1995 | (DE) . |
| 197 07 834 A1 | 2/1997 | (DE) . |

OTHER PUBLICATIONS

International Search Report; Jan. 7, 1999.

* cited by examiner

*Primary Examiner*—Samuel M. Heinrich

(57) ABSTRACT

The invention relates to a workpiece irradiation system which has several individually adjustable deflecting devices, and in which several spatially mutually separated individual processing beam pencils are respectively deflected separately, by means of the deflecting devices arranged in the optical beam path, to at least one workpiece to be irradiated, to variable points or surfaces on the workpiece. According to the invention, an additional beam source is arranged in the workpiece irradiation system for the production of at least one measuring beam pencil, such that the measuring beam pencil emitted by the additional beam source is simultaneously incident on several deflecting devices, and that a measuring receiving device which is sensitive to the wavelength of the measuring beam is arranged in the workpiece irradiation system such that it receives at least a portion of the measuring beam pencils, deflected by the irradiated deflecting devices, for the detection of the deflecting action of the deflecting devices.

7 Claims, 2 Drawing Sheets

WORKPIECE IRRADIATION SYSTEM

Figure 1:
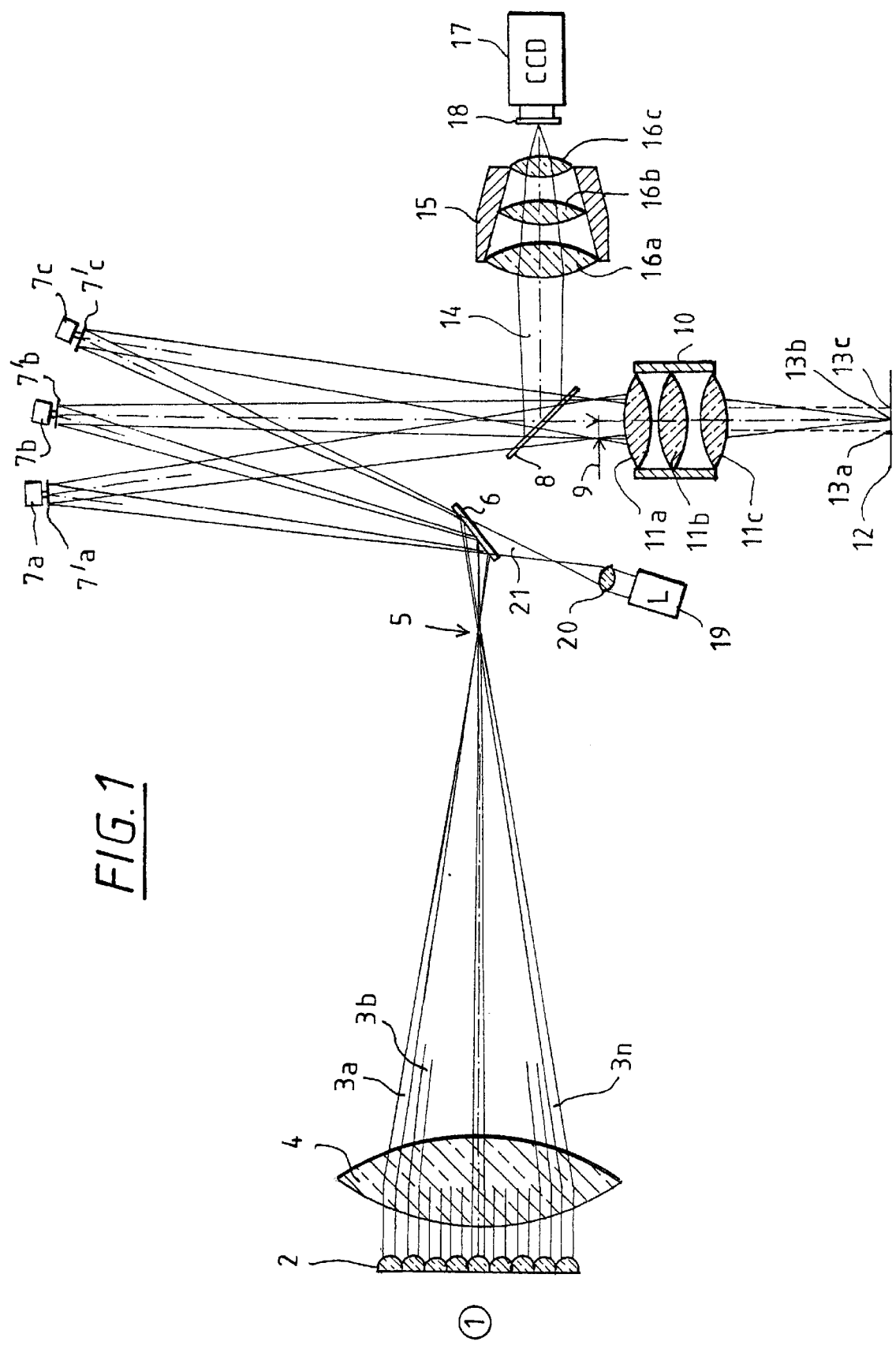

The invention relates to a workpiece irradiation system which has several individually adjustable deflecting devices, and in which several spatially mutually separated individual processing beam pencils are respectively deflected separately, by means of the deflecting devices arranged in the optical beam path, to at least one workpiece to be irradiated, at variable points or surfaces on the workpiece.

A workpiece irradiation system of this kind is known, in particular, from DE 195 13 354, DE 44 40 117, and DE 197 07 834.

The measurement for the calibration of a segment mirror field at present takes place by means of (laser) beams, with which material processing is also carried out; if necessary, the intensity of the beams is weakened at suitable places so that measuring elements, in this case a CCD camera, are not damaged. This method has the advantages that:

no additional laser is required, and no substantial distortions of the beam paths takes place, since the light used for measurement has the same wavelength as the light of the processing beam pencils and thus can be conducted, error-free, through the same optical components. (If the measuring beam pencil were to have another wavelength, it would be differently refracted by the given optics and would no longer be finally imaged on the CCD camera).

This method is used as long as the wavelength of the processed laser light can be processed by the CCD camera without problems. Thus, because of the required large-surface CCD array, it is:

technically simple and inexpensive in the wavelength range of 400 up to 1,000 nm, technically more demanding and dearer in the wavelength range of 200–400 nm, technically very demanding and very dear in the wavelength range of 1,000–5,000 nm, and technically extremely demanding and extremely dear in the wavelength range of 5,000 up to 20,000 nm.

The usual wavelengths for material processing in the printed circuit industry are at present 248 nm (excimer laser), 355 nm (frequency-tripled YAG laser) and 9,600 nm ($CO_2$ laser). The known principle thus lies just at the boundary of economical practicability for the two UV wavelengths. For the $CO_2$ laser, for technical and economic reasons, no solutions are possible which can be realized in mass production equipment.

The invention has as its object to provide a workpiece irradiation system in which the position of the tilting devices, in particular in a segment mirror field, can be determined independently of the wavelength of the light beam pencils used for the workpiece irradiation system.

This object is attained according to the invention by the features of claim 1. Advantageous embodiments of the invention will become apparent from the features of the dependent claims.

The workpiece irradiation system according to the invention has several independently adjustable deflecting devices, and several, mutually spatially separated, individual processing beam pencils are deflected, respectively separately, onto at least one workpiece to be irradiated, at variable points or surfaces on the workpiece.

The system is distinguished in that an additional beam source is arranged in the workpiece irradiation system for the production of at least one measuring beam pencil, such that the measuring beam pencil emitted by the additional beam source is simultaneously incident on several deflecting devices, and that a measuring receiving device which is sensitive to the wavelength of the measuring beam is arranged in the workpiece irradiation system such that it receives at least a portion of the measuring beam pencil, deflected by the irradiated deflecting devices, for the detection of the deflecting action of the deflecting devices.

Preferably, in a first variant of the invention, a first optical member is installed before the deflecting devices in the optical beam path of the processing beam pencils, and allows the processing beam pencils to be incident on the deflecting devices and couples the measuring beam pencils into the optical beam path of the processing beam pencils in the direction toward the deflecting devices, and a second optical member is installed after the deflecting devices and allows the processing beam pencils to be incident on points or surfaces on the workpiece, and couples at least the measuring beam pencils out of the optical path of the processing beam pencils in the direction toward the measuring receiving device. The optical members can in particular be dichroic mirrors or dichroic beam splitter cubes.

Preferably here at least one of the two optical members can be removed from the optical beam path of the processing beam pencils.

In a further variant of the invention, the measuring beam pencils are preferably incident on the deflecting devices at another angle than the processing beam pencils, so that the radiation source for the production of the measuring beam pencil and the measuring receiving device can be arranged laterally of the optical beam path of the processing beam pencils.

An evaluation device is to be connected at least to the receiving device, and compares a stored or predetermined reference state with the actual state measured with the evaluation device.

It is advantageous for reasons of cost for the wavelength of the measuring beam pencils to be situated in the visible wavelength region, particularly when the wavelength of the processing beam pencils is situated in the infrared or ultraviolet wavelength region.

A simple realization of the invention is obtained when each deflecting device consists of a tilting mirror.

The deflecting devices are preferably adjustable by motors.

The deflecting devices can be realized as tilting devices with respective tilting members. If these have mirror surfaces, they can also be termed tilting mirrors, the tilting mainly taking place in one or two axes. The deflecting devices are to be embodied respectively separate from each other, in order to make certain a more secure beam guidance for each processing beam pencil, independently of the other processing beam pencils. This means nothing more than that each individual processing beam pencil is deflectable by a respective one tilting mirror which is allocated only to the respective individual deflecting device, where the deflection preferably corresponds to a reflection.

The measuring beam pencil must not be incident on the whole surface of the deflecting device, but can only be incident on a portion (preferably, a reflecting portion).

The deflecting device can be a tilting device with a tilting member, the front side of which is preferably at least partially mirror-finished, and the measuring beam is then incident on this mirror-finished surface for the measurement.

If a projection objective, preferably a F-TETA objective, is arranged between the deflecting devices and the workpiece surface, for the focusing of the workpiece irradiation pencil, the workpiece irradiation pencil is then very precisely focused on the workpiece surface, and by the use of the F-TETA objective, the irradiation of the workpiece takes place always about parallel to the optical axis of the projection objective.

An observation objective is to be arranged in front of the measuring receiving device, and assists in effecting the required measurement as quickly as possible at the required precision.

When the surface of the mirror arrangement is undivided as first and/or second optical members, it can then move with a higher positioning accuracy.

In order to minimize positioning errors, the first optical member forming the first mirror arrangement was to be partially transparent, and in fact reflective for the wavelength of the beam pencils irradiating the workpiece and transparent for the wavelength of the measuring beam pencil.

A second optical member forming a second mirror arrangement is preferably installed after the tilting devices which serve as deflecting devices, and deflects the measuring beams onto the measuring receiving device. This second mirror arrangement is preferably removable, e.g., pivotable, from the beam path of the workpiece irradiating beam pencils. Here also it is advantageous, from the standpoint of positional accuracy, if the second mirror arrangement is partially transmissive and in fact reflecting for the wavelength of the measuring beam pencils and transparent for the wavelength of the workpiece irradiating beam pencils.

It is advantageous if the workpiece irradiating beam pencils emerge, spatially separately, from a lens array. A relatively simple construction is obtained when the lens array is followed by a common focusing lens for all the workpiece irradiating beam pencils.

All the beams are to pass through a common focus before the first mirror arrangement.

Preferably the beam mid-axes of the workpiece irradiating beam pencils pass, in the basic position, through a common pupil before the F-TETA objective. Also, several receiving devices can be arranged in the apparatus for different mirrors of the mirror array.

The invention is described in more detail herein below by means of an embodiment example, with reference to the accompanying drawings; the following example has no limitative character for the invention, and includes further advantageous forms of the invention.

Figure 2:
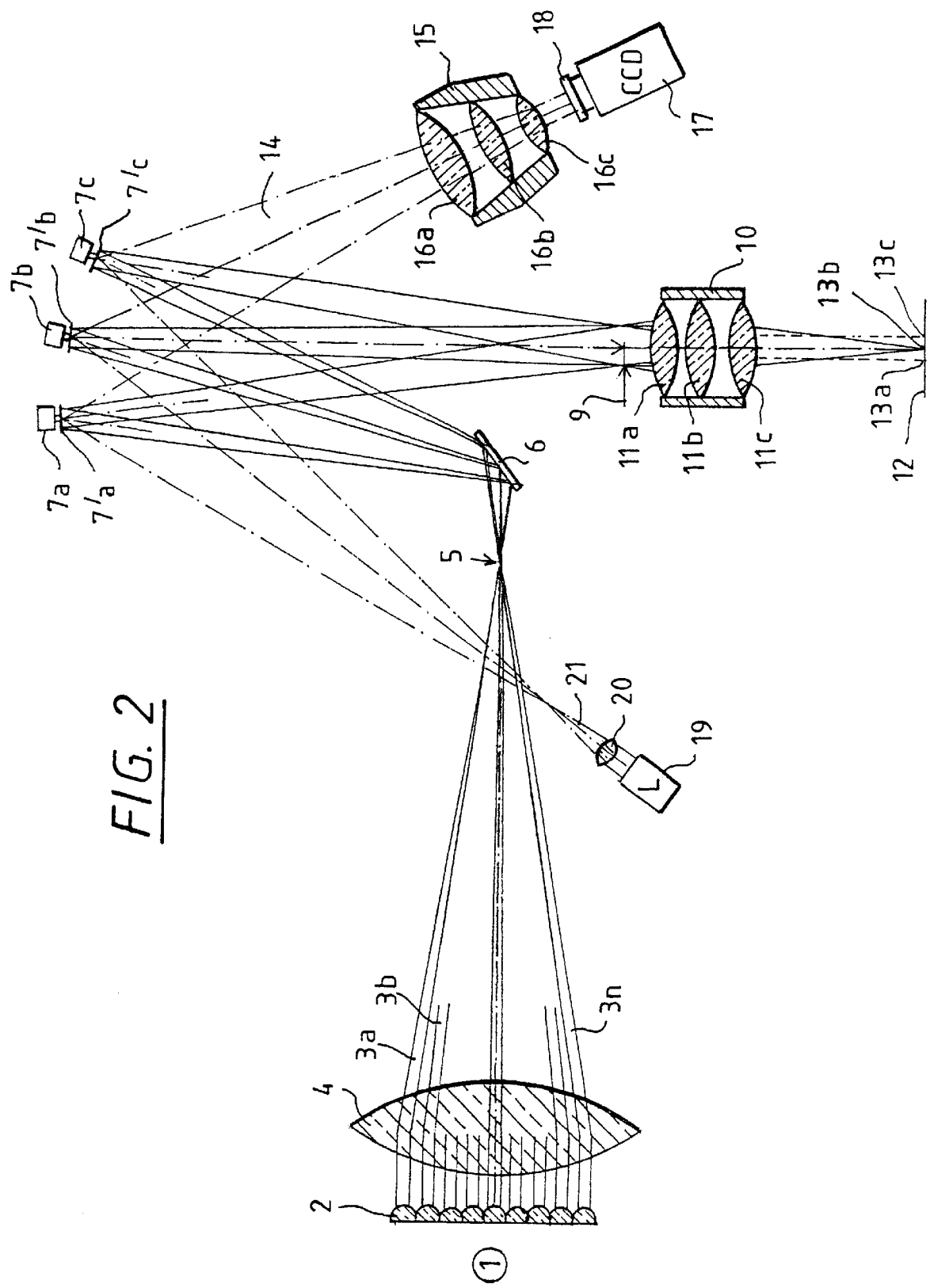

FIG. 1 is a sketch of principles of the beam paths for a first and a second variant of the invention; and FIG. 2 is a sketch of principles of the beam paths for a third variant of the invention.

Two different variants of the invention can be illustrated with the arrangement shown in FIG. 1.

In both variants, a processing laser, as the main laser, produces a laser beam (1) which is shaped by an optical arrangement (according to the desired specifications) arranged after the processing laser. This portion according to the known state of the art is not shown in the Figure.

This laser beam (1) is then incident on an optical arrangement (2) (e.g., a lens array) which divides the laser beam (1) into many discrete, mutually spatially separate, multi-beam pencils ($3a$, $3b$, ..., $3n$) which run parallel to each other. All the multi-beam pencils ($3a$, $3b$, ..., $3n$) are then incident on a further optical arrangement (4) (in this case, a correspondingly large lens with refractive action), which focuses all the multi-beam pencils at one point (5). After the multi-beam pencils ($3a$, $3b$, ..., $3n$) have passed through the focus point (5), they are incident on a segment mirror ($7a$, $7b$, $7c$), wherein each individual beam pencil of the multi-beam pencils ($3a$, $3b$, ... $3n$) is allocated to its own mirror ($7'a$, $7'b$, $7'c$) of the segment mirror ($7a$, $7b$, $7c$). The number of the mirrors ($7'a$, $7'b$, $7'c$) corresponds to the number of the multi-beam pencils, although for the sake of clarity only three mirrors are shown in the Figures.

The segment mirror ($7a$, $7b$, $7c$) deflects the multi-beam pencils ($3a$, $3b$, ..., $3n$) in the basic position through a projection objective (10), which is preferably composed of several lenses ($11a$, $11b$, $11c$). This projection objective (10) ensures that the multi-beam pencils ($3a$. $3b$, ..., $3n$) are incident perpendicularly on the workpiece surface (12) and have their respective focus ($13a$, $13b$, $13c$) there.

A first deflecting mirror is arranged between the optical arrangement (4) and the segment mirror ($7a$, $7b$, $7c$), and ensures a deflection of the multi-beam pencils ($3a$, $3b$, $3c$) onto the segment mirror (8). A further deflecting mirror (8) is arranged between the segment mirror ($7a$, $7b$, $7c$) and the projection objective (10).

A second laser (19) is arranged on the side of the rearward extension of the multi-beam pencils which is deflected at the first deflecting mirror (6). This produces a measuring laser beam (21), the acceptance angle of which is formed by a corresponding optical arrangement (20) such that it encloses as exactly as possible the deflected multi-beam pencils ($3a$, $3b$, $3c$). The light of the measuring laser beam (21) is thus incident on the individual mirrors ($7a'$, $7b'$, $7c'$) of the segment mirror ($7a$, $7b$, $7c$) at exactly the same angle as the multi-beams pencil ($3a$, $3b$, $3c$).

In a first variant of the invention, the two deflecting mirrors (6, 8) are given a dichroic coating such that the first deflecting mirror (6) has a high reflectivity for the multi-beam pencils ($3a$, $3b$, ..., $3n$) from the laser beam (1) of the processing laser, and the highest possible transmission for the measuring laser beam (21) from the second laser (19), wherein the measuring laser (19) emits its laser beam (21) in the visible spectral region. This measuring laser beam (21) is then incident on the segment mirror ($7a$, $7b$, $7c$) together with the multi-beam pencils ($3a$, $3b$, ..., $3n$) of the processing laser, and is thereby deflected toward the projection objective (10).

In contrast to this, the second deflecting mirror (8) has a dichroic coating such that it has high reflectivity for the laser beam (21) of the measuring laser (19) and the highest possible transmission for the multi-beam pencils ($3a$, $3b$, ..., $3n$) of the processing laser. The beam pencil (14) of the measuring laser beam (21) produced by the segment mirror ($7a$, $7b$, $7c$) is deflected by the second deflecting mirror (8) to an observation objective (15), which images the beam pencil (19) into the objective of a CCD camera (17) and which itself preferably consists of several lenses ($16a$, $16b$, $16c$).

In a second variant of the invention, the two deflecting mirrors (6, 8) are removable from the beam path, e.g., can be pivoted out or pushed out. When processing takes place, the first deflecting mirror (6) is pivoted in and the second deflecting mirror (8) is pivoted out. If on the contrary a measurement takes place, the first deflecting mirror (6) is pivoted out and the second deflecting mirror (8) is pivoted in. The reflectivity of the mirrors (6, 8) can be respectively optimized for the multi-beam pencils ($3a$, $3b$, ..., $3n$) of the processing laser or the measuring laser beam (21) of the measuring laser which is incident on it. The measuring laser beam (21), during measurement, is always incident on the segment mirror ($7a$, $7b$, $7c$) at the same angle as the processing laser beams ($3a$, $3b$, $3c$), and is deflected in the same manner and at the same angle toward the projection objective (10). The beam pencils (14) of the measuring laser beam (21) is also deflected here by the second deflecting mirror (8) onto the observation objective (18), which images the beam pencil (14) in the objective (18) of a CCD camera (17).

The advantage of the first and second processes is that the measurement beams (14) are deflected at the same angle by the mirrors (7a', 7b', 7c') of the segment mirror (7a, 7b, 7c). The first process has in addition the advantage that the measurement can take place simultaneously with the processing or at least shortly before or after the processing. Should the residual reflectivity of the second deflecting mirror (8) lead, at a given sensitivity of the CCD camera (17) for the wavelength of the processing laser, to an interfering signal background, the residual light of the processing laser can be eliminated by means of a suitable filter.

FIG. 2 now shows a third variant of the solution according to the invention. This variant differs from the two variants described hereinabove, substantially only in that the measuring laser beam (21) (which is formed as in the two variants described in FIG. 1) is incident on the segment mirror (7a, 7b, 7c) at an angle other than that of the multi-beam pencils (3a, 3b, . . . , 3n) of the processing laser, and therefore no additional deflecting mirror is required for the measuring laser beam (21, 14). The apparatus construction for the deflection of the multi-beam pencils (3a, 3b, . . . , 3n) of the processing laser inclusive of the first plane mirror (6) (which could also be omitted in another construction) is the same as that shown in FIG. 1, since the beam path of the multi-beam pencils (3a, 3b, . . . , 3n) of the processing laser is also given here in the same manner. The second plane mirror (8 in FIG. 1) can however be completely omitted here, since it only serves for the decoupling of the measuring beam (14) from the beam path of the multi-beam pencils (3a, 3b, . . . , 3n).

Since, however, the angle of incidence is always identical to the angle of reflection in the case of a mirror, the position of the mirrors (7a', 7b', 7c') in the mirror segment (7a, 7b, 7c) an be derived directly and purely computationally (by means of a computer, not shown in the Figure) from the observation of the beam pencils (14) of the measuring laser (19), or a correction optics (e.g., in the form of a prism, not shown in the Figure) can correspondingly correct the beam paths of the individual measuring laser beam pencils (14). Thus only slight distortions occur at the segment mirror (7a, 7b, 7c) due to the different angles of the beam pencils (14, 3a, 3b, . . . , 3n), since the angle difference between the measuring beam pencil (14) and the multi-beam pencils (3a, 3b, . . . , 3n) is very small. In order to ensure this, the light of the measuring laser (19) is to be conducted as close as possible past the first plane mirror (6).

The observation objective (19), now oriented with its optical axis in the direction of the segment mirror (7a, 7b, 7c), can be represented by a cylindrical, anamorphic Galilean telescope objective, which in particular can also be corrected for elliptic distortions, if the elliptic distortions are not already corrected in another fashion, e.g., by a prism.

The computer for the displacement of the mirrors (7a', 7b', 7c') of the segment mirror (7a, 7b, 7c) and also the required adjusting devices is according to the state of the art for the individual mirrors (7a', 7b'7c') of the segment mirror (7a, 7b, 7c), and since the technique is known in the state of the art, this is not shown in the drawings.

Finally, the solution according to the invention is based on the use of an additional laser (19) in the visible region for measurement purposes, e.g. a He—Ne laser, as the measuring laser (19), and a standard CCD chip or camera (19), which is available with a large surface for this wavelength, and nevertheless without technical problems and relatively inexpensively.

Since visible light, when it passes through infrared optics, is refracted quite differently than infrared radiation, passage of the visible measuring light, and the infrared or ultraviolet radiation of the processing laser, through the same optics must be avoided. The discussions hereinbefore describe a measurement of the segment mirror (7a, 7b, 7c) based solely on reflection.

Alternatively, for the described variants 1 and 2, when the measurement does not have to take place simultaneously with the processing, a mirror (8) can be used (in the measuring arrangement) which is transmissive only for IR or UV light and which reflects visible light. The main laser is then switched out for the measuring process and is removed from the optical axis (e.g., pivoted out), and the measuring laser is switched in on the optical axis of the main laser for the measuring process. The measuring laser then needs to produce no multi-beam pencils. It is important only that it completely illuminates, at the correct angle, the segment mirror (7a, 7b, 7c) with its individual tilting mirrors (7a', 7b', 7c'). On the one hand, the bounding of the individual mirrors (7a', 7b',7c') produces the desired multi-measuring beam pencils (14) by reflection, and on the other hand, the energy density of the measuring laser (19) is small enough that it does not bring about any damage in the interspaces between the tilting mirrors (7a', 7b', 7c') of the segment mirror (7a, 7b, 7c).

The coating of the plane mirrors (6, 8) is to be such that they optimally reflect or transmit the multi-beam pencils (3a, 3b, . . . , 3n) of the processing laser, and yet transmit or reflect the light (21) of the measuring laser (19) sufficiently strongly. This takes place by means of measures known in the state of the art, preferably by means of a corresponding coating such as is frequently produced in optics.

The coupling-out of the measuring beam pencils (14) of the measuring laser (19) according to the first two measuring processes preferably takes place before the first refractive element after the segment mirror (7a, 7b, 7c), with a so-called second filter mirror (8). This second filter mirror (8) is advantageously such that it transmits IR or UV radiation and, e.g., reflects He—Ne radiation - which is possible, e.g., by means of correspondingly coated germanium. This second filter mirror (8) can then be built in to be stationary.

Alternatively, mirrors (8) which reflect only He—Ne are used when the measurement does not have to take place simultaneously with the processing. The second filter mirror (8) is then moved in or out simultaneously with the first filter mirror (6).

The observation objective (15) is advantageously constituted such that the same image pattern is produced on the chip of the CCD camera as that produced in the observation plane (12) by the projection objective (10). The image pattern produced by the segment mirror (7a, 7b, 7c), and thus the individual tilting mirrors (7a', 7b', . . . , 7c'), can always be measured and adjusted or calibrated by means of a simple He—Ne measuring laser (19) and a standard CCD camera (17), with respect to the position of its respective mirror surfaces, independently of the wavelength of the processing laser.

The measuring laser (19) can also be coupled-in before the last refractive element before the segment mirror (7a, 7b, 7c) and after the first refractive element behind the segment mirror, when the preceding optics or the observation objective (15) is configured such that they then compensate the focusing of the measuring beams of the measuring laser (19) deviating from the multi-beam pencils (3a, 3b, . . . , 3n) of the processing laser.

The tilt angle of the filter mirrors (6, 8) in the beam path can plainly deviate from the principle image and can be selected as required by the constitution of the device into which the device is built. Resulting, particularly elliptic, distortions can easily be corrected with the known mathematical computer programs, or by a corresponding correcting optics (according to the state of the art, therefore not shown in the Figures).

In the solution with two pivoting mirrors (6, 8), either measurement only or processing only is possible, with either the processing laser or the measurement laser (19) being switched in. During processing, the first mirror (6) is switched in and the second mirror (8) is pivoted out. Or a measurement of the segment mirror (7a, 7b, 7c) takes place, so that the first mirror (6) is pivoted out and the second mirror (8) is pivoted in. As long as a movement of one of the two mirrors (6, 8) has to take place, a certain measurement uncertainty exists. This measurement uncertainty is prevented by using dichroic mirrors in the first variant.

In the third alternative, the measurement light is incident at another angle on the tilting mirrors of the segment mirror (7a, 7b, 7c), so that measurement and observation can take place simultaneously, and no movement has to take place between processing and measurement, so that the measurement reliability is increased.

What is claimed is:

1. A workpiece irradiation system which has several individually adjustable deflecting devices, and in which several spatially mutually separated individual processing beam pencils in the infrared or ultraviolet wavelength region are deflected, by means of the deflecting devices arranged in the optical beam path of the processing beam pencils, respectively separately to at least one workpiece to be irradiated to variable points or surfaces on the workpiece, and wherein an additional beam source is arranged in the workpicce irradiation system for the production of at least one measuring beam pencil, such that the measuring beam pencil emitted by the additional beam source is simultaneously incident on several deflecting devices, and a measuring receiving device is arranged in the workpiece irradiation system such that it receives at least a portion of the measuring beam pencils deflected by the irradiated deflecting devices, for the detection of the deflecting action of the deflecting devices, characterized in that the wavelength of the at least one measuring beam pencil is situated in the visible wavelength region, and the measuring receiving device is sensitive to light in the visible wavelength region.

2. Workpiece irradiation system according to claim 1, characterized in that a first optical member is installed before the deflecting devices in the optical beam path, and couples the measuring beam pencils into the optical beam path of the processing beam pencils in the direction toward the deflecting devices, and that a second optical member is installed after the deflecting devices and allows the processing beam pencils to be incident on points or surfaces on the workpiece, and couples at least the measuring beam pencil (s) out of the optical beam path of the processing beam pencils in the direction toward the measuring receiving device.

3. Workpiece irradiation system according to claim 2, characterized in that at least one of the two optical members is removable from the optical beam path of the processing beam pencils.

4. Workpiece irradiation system according to claim 1, characterized in that a measuring beam pencil which encloses at least a few of the individual processing beam pencils is incident on the deflecting devices.

5. Workpiece irradiation system according to claim 1, characterized in that the measuring beam pencil(s) is/are incident on the deflecting devices at another angle than the processing beam pencils, so that the radiation source for the production of the measuring beam pencil(s) and the measuring receiving device are arranged laterally of the optical beam path of the processing beam pencils.

6. Workpiece irradiation system according to claim 1, characterized in that an evaluation device is connected at least to the receiving device, and compares a stored or predetermined reference state with the actual state measured by the evaluation device.

7. Workpiece irradiation system according to claim 1, characterized in that each deflecting device consists of a tilting mirror.

* * * * *